(12) United States Patent
Pietrzak et al.

(10) Patent No.: US 8,006,711 B2
(45) Date of Patent: Aug. 30, 2011

(54) TREKKING POLE CLAMP AND METHODS

(75) Inventors: Christopher T. Pietrzak, Park City, UT (US); Ross M. Hinschberger, West Valley City, UT (US)

(73) Assignee: Easton Technical Products, Inc., Salt Lake City, UT (US)

( * ) Notice: Subject to any disclaimer, the term of this patent is extended or adjusted under 35 U.S.C. 154(b) by 0 days.

(21) Appl. No.: 12/348,692

(22) Filed: Jan. 5, 2009

(65) Prior Publication Data

US 2010/0170547 A1     Jul. 8, 2010

(51) Int. Cl.
*A45B 3/12* (2006.01)
*A63C 11/22* (2006.01)

(52) U.S. Cl. ............ 135/75; 135/65; 280/819; 280/823; 248/230.2

(58) Field of Classification Search .............. 135/65–66, 135/69, 75, 76; 24/270–271, 273; 248/230.1, 248/230.2, 231.21, 411, 218.4, 229.1; 280/814, 280/81, 823–824, 819; 285/365, 409; 403/102–103
See application file for complete search history.

(56) References Cited

U.S. PATENT DOCUMENTS

| | | | |
|---|---|---|---|
| 2,884,270 A | | 4/1959 | Carlberg |
| 3,084,964 A | * | 4/1963 | Ruth .............................. 403/235 |
| 3,556,544 A | | 1/1971 | Hauser |
| 3,705,737 A | * | 12/1972 | Westerlund et al. .......... 285/365 |
| 3,828,403 A | * | 8/1974 | Perrin et al. .................... 24/270 |
| 4,123,095 A | | 10/1978 | Stehlin |
| 4,253,479 A | | 3/1981 | Laurent |
| 4,448,442 A | | 5/1984 | Weber-Henning et al. |
| 4,497,092 A | | 2/1985 | Hoshino |
| 4,573,717 A | * | 3/1986 | Peacock ......................... 285/365 |
| 4,639,979 A | * | 2/1987 | Polson .......................... 482/107 |
| 4,643,460 A | * | 2/1987 | Lieberg .......................... 285/112 |
| 4,761,092 A | | 8/1988 | Nakatani |
| 5,154,449 A | | 10/1992 | Suei-Long |
| 5,259,690 A | * | 11/1993 | Legge ............................ 403/385 |
| 5,441,307 A | | 8/1995 | Quintana et al. |
| 5,664,904 A | | 9/1997 | Hapgood et al. |
| 5,775,352 A | | 7/1998 | Obitts |
| 5,778,914 A | | 7/1998 | Trani |
| 6,142,526 A | | 11/2000 | Katz |
| 6,203,064 B1 | | 3/2001 | Zaltron |
| 6,341,614 B1 | | 1/2002 | Tucker et al. |
| 6,546,596 B2 | | 4/2003 | Grote et al. |
| 6,644,328 B1 | | 11/2003 | Lenhart |
| 6,672,631 B1 | * | 1/2004 | Weinhold ....................... 285/409 |
| 6,676,329 B2 | | 1/2004 | Mandon et al. |
| 6,749,227 B2 | | 6/2004 | Margid |
| 6,782,903 B1 | | 8/2004 | Jarman et al. |
| 6,938,927 B1 | | 9/2005 | Martin et al. |
| D540,534 S | | 4/2007 | Chan |
| 7,201,401 B1 | | 4/2007 | Friedman |
| 7,244,070 B2 | * | 7/2007 | Burnett et al. ................ 396/420 |
| 7,261,263 B2 | * | 8/2007 | Baker et al. ................. 248/218.4 |
| 7,337,933 B1 | | 3/2008 | Klinberg |

(Continued)

*Primary Examiner* — Winnie Yip
(74) *Attorney, Agent, or Firm* — Holland & Hart

(57) ABSTRACT

A clamp apparatus that includes a base portion and an adjustable clamping lever. The base portion defines an adjustable size aperture. The adjustable clamping lever is mounted to the base portion and is movable between an unlatched position and a latched position. The adjustable clamping lever has a length that is adjustable to clamp the base portion to elongate members having a cross-section. The adjustable clamping lever may include at least two link members. One of the link members may have an adjustable length.

13 Claims, 5 Drawing Sheets

U.S. PATENT DOCUMENTS

| | | |
|---|---|---|
| 7,344,320 B2 | 3/2008 | Barker et al. |
| 7,377,551 B2 | 5/2008 | Silverman et al. |
| 2005/0083679 A1 | 4/2005 | Macierowski et al. |
| 2006/0204322 A1 | 9/2006 | Roiser |
| 2007/0092332 A1 | 4/2007 | Moore |
| 2007/0108756 A1 | 5/2007 | Laakso et al. |
| 2007/0164551 A1 | 7/2007 | Malone |
| 2007/0187441 A1 | 8/2007 | Klinberg |
| 2008/0035193 A1 | 2/2008 | Baker |
| 2008/0116682 A1 | 5/2008 | Best et al. |
| 2008/0121260 A1 | 5/2008 | Stephens et al. |

\* cited by examiner

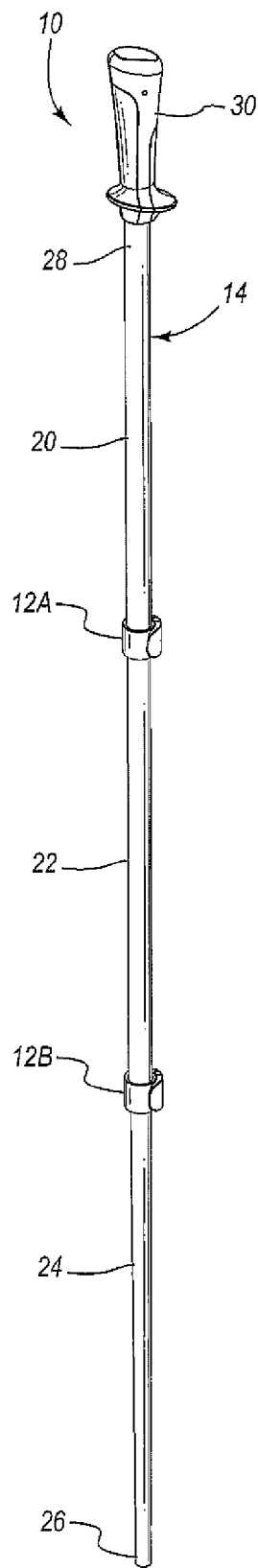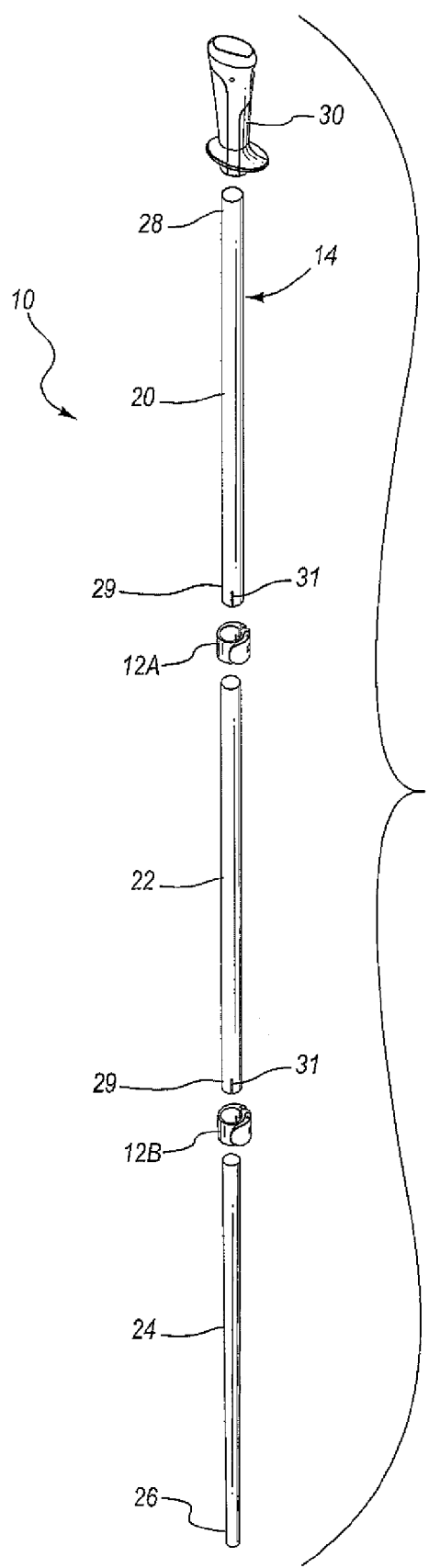
FIG. 1
FIG. 2

TREKKING POLE CLAMP AND METHODS

TECHNICAL FIELD

The present disclosure relates generally to the field of clamp mechanisms, and more particularly relates to clamp mechanisms for use in adjustable length trekking poles.

BACKGROUND

There are many activities where the use of a pole is beneficial. For example, downhill skiers use poles to stabilize themselves as they traverse the mountain. In addition, where the skier plants the pole helps define a pivot point about which the skier turns. Snowshoeing in deep snow is an example of a sport where an adjustable pole is useful. Deep soft snow may be somewhat unstable to walk in without poles. An adjustable pole is particularly useful in snowshoeing because one may adjust for varying depths of snow. Cross-country skiing also uses adjustable poles not only for stability, but for propulsion as well. Hikers and trekkers commonly use poles to minimize knee impact by supporting a portion of their body weight on the poles rather than their legs.

An adjustable pole is particularly helpful to provide proper height adjustment for different users and for different activities. In some instances, providing proper pole height for a user may reduce stress on the user's body. Adjustable poles typically include a telescoping arrangement of parts that includes at least two pole segments that slide one into the other. The overlapping pole segments permit length adjustment. Typically, some type of locking mechanism is operably positioned where the pole segments overlap to adjustably lock the segments in a particular lengthwise position relative to one another.

SUMMARY

One aspect of the present disclosure relates to a clamp apparatus that includes a base portion and an adjustable clamping lever. The base portion defines an adjustable size aperture. The adjustable clamping lever is mounted to the base portion and is movable between an unlatched position and a latched position. The adjustable clamping lever has a length that is adjustable to clamp the base portion to elongate members having a cross-section.

The adjustable clamping lever may include first and second link portions, wherein the first link portion has a first end connected to the base member and a second end connected to the second link portion. The second link portion includes a pivot end that contacts the base member at a pivot surface and an actuator end that is engageable by a user to move the adjustable clamping lever between the latched and unlatched positions. The pivot end may include a first constant radius surface and the pivot surface includes a second constant radius surface. A length of the first link portion may be variable. A length of the second link portion measured between the pivot end and a point at which the second link portion is connected to the first link portion is constant. The adjustable size aperture may have a circular cross-section. The adjustable clamping lever may include at least a first link member having an adjustable length. The first link member may include first and second link segments, wherein the first link segment has a threaded protrusion sized to rotatably engage within a threaded aperture of the second link segment. The elongate member may be a trekking pole and the cross-section of the trekking pole is generally circular. In one embodiment, the adjustable size aperture and the elongate member have non-circular cross-sections.

Another aspect of the present disclosure relates to a trekking pole assembly that includes a pole assembly and a first clamp apparatus. The pole assembly may include a first pole member, and a second pole member that is insertable within the first pole member. The first clamp apparatus may be mounted to the first pole member and include a base portion and an adjustable clamping lever. The base portion defines an adjustable size aperture. The adjustable clamping lever is mounted to the base portion and is movable between an unlatched position and a latched position. The adjustable clamping lever may have a length that is adjustable to clamp the first clamp apparatus to the first pole member to fix a relative position of the first and second pole members.

The clamp apparatus may permit relative movement between the first and second pole members when the adjustable clamping lever is in the unlatched position. The clamp apparatus applies a constricting force to the first pole member that restricts relative movement between the first and second pole members when the adjustable clamping lever is in the latched position.

The adjustable clamping lever includes first and second link portions, the first link portion having a first end connected to the base member and a second end connected to the second link portion, the second link portion having a pivot end that contacts the base member at a pivot surface and an actuator end that is engageable by a user to move the adjustable clamping lever between the latched and unlatched positions. A length of the first link portion may be variable. A length of the second link portion measured between the pivot end and a point at which the second link portion is connected to the first link portion may be constant.

The pole assembly may further include a third pole member and a second clamp apparatus. The third pole member is insertable within the second pole member. The second clamp apparatus includes a base portion defining an adjustable size aperture, and an adjustable clamping lever mounted to the base portion. The adjustable clamping lever is movable between an unlatched position and a latched position. The adjustable clamping lever has a length that is adjustable to clamp the second clamp apparatus to the second pole member to fix a relative position of the second and third pole members.

Another aspect of the present disclosure relates to a method of operating a clamp apparatus, wherein the clamp apparatus includes a base member and an adjustable clamping lever. The base member defines an adjustable size aperture. The adjustable clamping lever is mounted to the base portion and is movable between a latched position and an unlatched position. The method steps may include adjusting the adjustable clamping lever to a first length, moving the adjustable clamping lever from the unlatched position to the latched position to secure the clamp apparatus to an elongate member having a first cross-section, adjusting the adjustable clamping lever to a second length, and moving the adjustable clamping lever from the unlatched position to the latched position to secure the clamp apparatus to a elongate member having a second cross-section.

Adjusting the adjustable clamping lever to a second length may include shortening a portion of the adjustable clamping lever. The adjustable clamping lever may include at least first and second link members pivotally connected to each other, wherein the first link member has an adjustable length, and the second link member has a fixed length. Adjusting the adjustable clamping lever to a first length or a second length may include adjusting a length of the first link member.

The first link member may include first and second link segments that are threadably engaged to each other, and adjusting a length of the first link member to a first length or a second length may include rotating the first and second link segments relative to each other. The first link member may be connected to the base member, and the second link member may include a first pivot surface that is configured to engage a second pivot surface of the base member. Moving the adjustable clamping lever from the unlatched position to the latched position may include contacting the first pivot surface with the second pivot surface and rotating the first pivot surface relative to the second pivot surface. Moving the adjustable clamping lever from the unlatched position to the latched position may include moving the first and second link members relative to each other past a top dead center pivot point to provide a positive lock.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 1 is a perspective view of an example trekking pole assembly having at least two clamp assemblies in accordance with principles of the present disclosure.

FIG. 2 is an exploded perspective view of the trekking pole assembly shown in FIG. 1.

Figure 3:
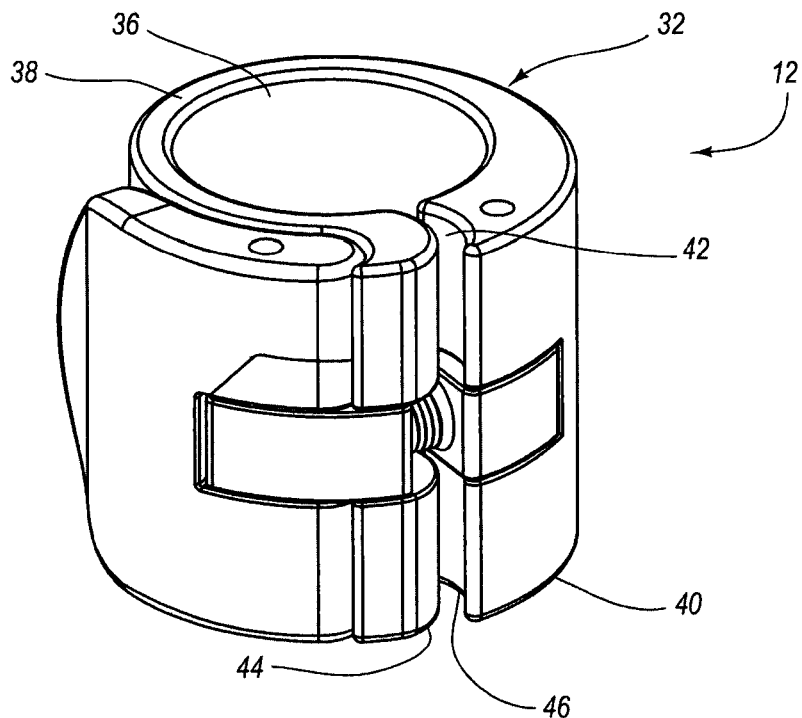
FIG. 3 is a perspective view of an example clamp assembly in accordance with principles of the present disclosure with the clamp assembly in a closed position.
Figure 4:
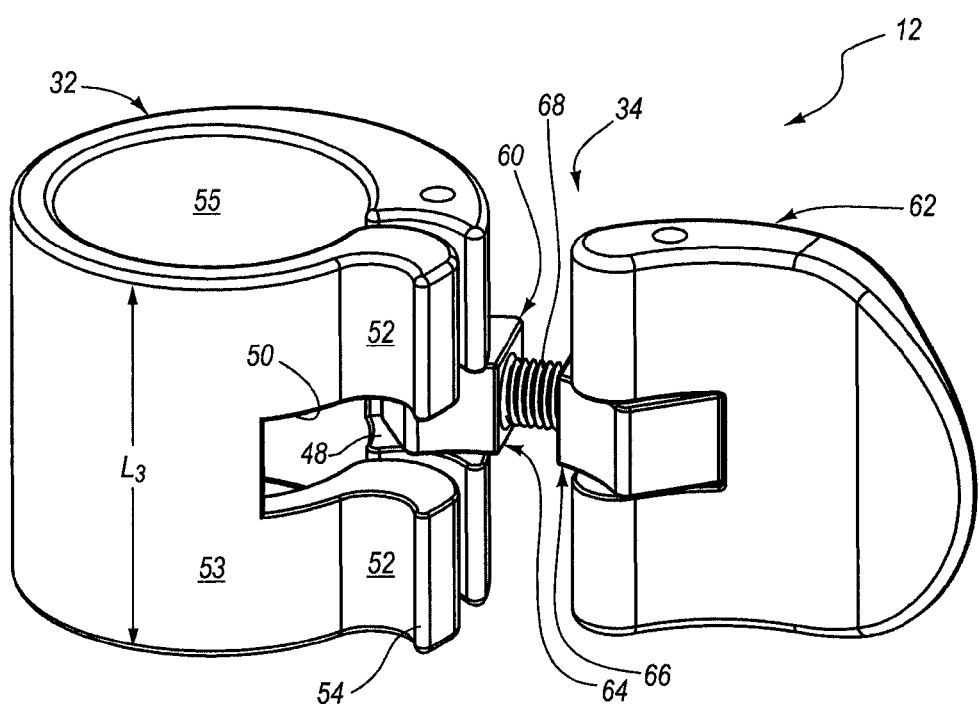
FIG. 4 is a perspective view of the clamp assembly shown in FIG. 2 with the clamp assembly in an open position.
Figure 5:
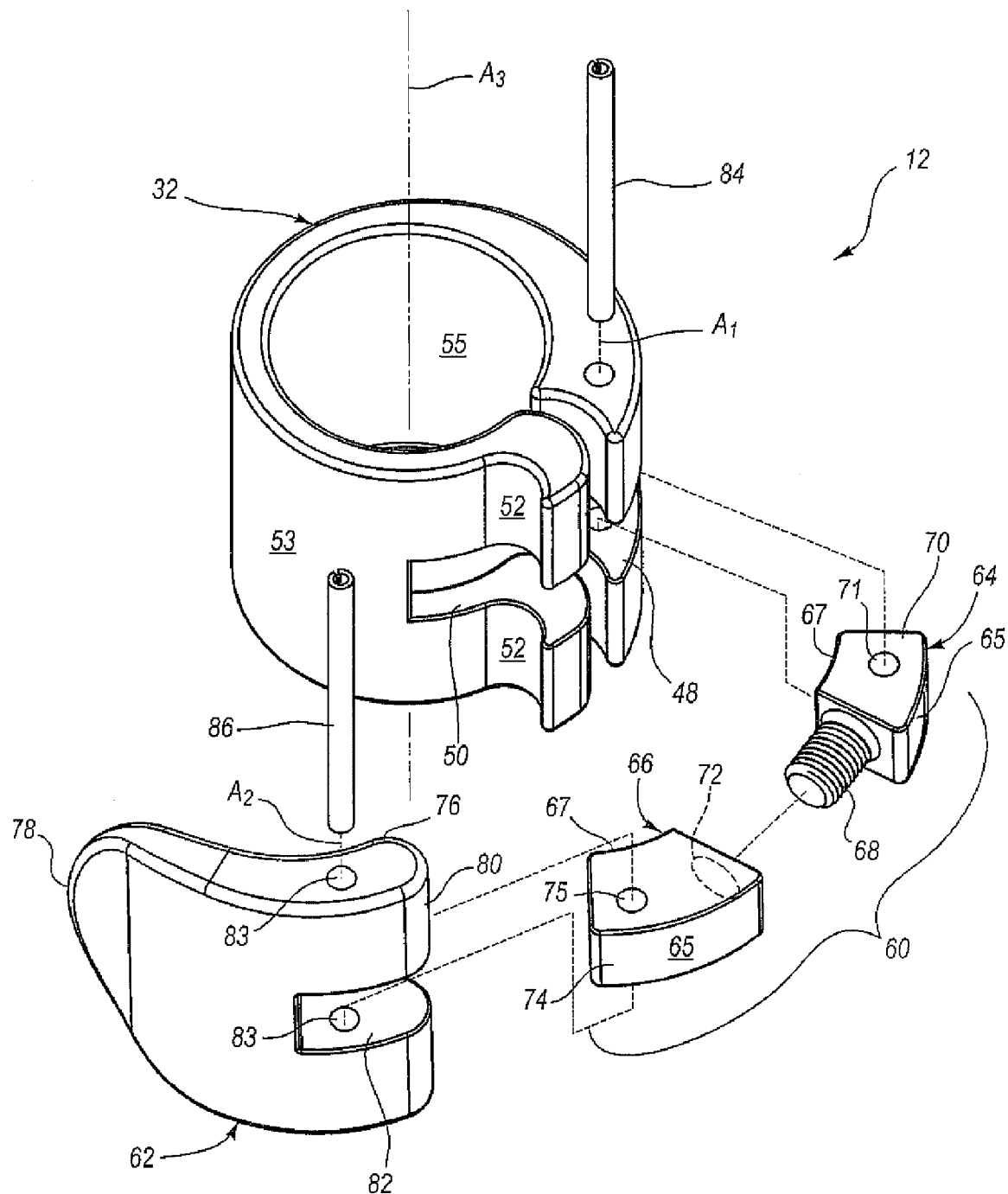
FIG. 5 is an exploded perspective view of the clamp assembly shown in FIG. 3.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION

FIGS. 1 and 2 illustrate an example trekking pole assembly 10 according to at least one embodiment. Trekking pole assembly 10 includes first and second clamp assemblies 12a, 12b, and a pole assembly 14. Pole assembly 14 includes first, second and third pole members 20, 22, 24. In other embodiments, the pole assembly 14 may include only first and second pole members and a single clamp assembly. In still further embodiments, more than three pole members may be included in the pole assembly and more than two clamp assemblies may be used to control relative movement between the various pole members of the pole assembly.

The pole members 20, 22, 24 are shown in FIGS. 1 and 2 having a generally cylindrical shape with a circular cross-section. In other embodiments, at least one of the pole members 20, 22, 24 may include a different cross-sectional shape. For example, any one of the pole members 20, 22, 24 can include a polygonal cross-sectional shape, an oval shape, or a generally circular shape having a plurality of grooves formed in the outer surface of the pole member. The pole members 20, 22, 24 may also have a generally tapered structure along at least a portion of the length of the pole member. The tapered structure may provide a varying cross-sectional size for any given cross-sectional shape of the pole member.

The pole assembly 14 shown in FIGS. 1 and 2 includes a first pole assembly end 26 and a second pole assembly end 28. A pole foot or pole tip structure (not shown) may be mounted to the first pole assembly end 26. Typically, a handle portion 30 is mounted to the second pole assembly end 28. The handle portion 30 may be configured for grasping by a user when the trekking pole assembly 10 is in use.

Each of the first and second pole members 20, 22 may include a compressible end portion 29. The compressible end portion 29 may include a slot 31 or other structure that provides for contraction of an inner diameter of the pole member at the compressible end portion 29. When the compressible end portion 29 is in a relaxed or rest position, the inner diameter of the pole member is sized for inserting one pole member into the other pole member to create the pole assembly 14. In one example, the compressible end portion 29 of the first pole member 22 when in a rest position is sized for insertion of at least a portion of the second pole member 22. After such insertion, the compressible portion 29 of the first pole member 20 is contracted via, for example, operation of the clamp assembly 12a to provide a tight fit between an inner diameter surface of the first pole member 20 with an outer diameter surface of the second pole member 22. The tight fit between the first and second pole members 20, 22 resists relative longitudinal movement of the first and second pole members 20, 22. Release of the clamp assembly 12a permits relative longitudinal movement of the first and second pole members 20, 22 to adjust a length of the pole assembly 14.

The clamp assemblies 12a, 12b are further described and illustrated with reference to clamp assembly 12 in FIGS. 3-9. Clamp assembly 12 includes a base portion 32 and an adjustable clamping lever 34. The base portion 32 may be mounted to one of the pole members 20, 22, 24 of the pole assembly 14 such as, for example, to the compressible portion 29 of one of the first and second pole members 20, 22. Operation of the adjustable clamping lever 34 may apply a constricting or compressive force to the compressible portion 29.

The base portion 32 defines an adjustable size aperture 36, opposing first and second open ends 38, 40, a compression slot 42 defined between spaced apart first and second longitudal edges 44, 46, and first and second link spots 48, 50. The base portion 32 also includes a pivot recess surface 52 and a pivot recess lip 54. The pivot recess surface 52 has a radius of curvature $R_1$. The pivot recess lip 54 defines an access or entrance point to the pivot recess surface 52. In some embodiments, the pivot recess surface 52 has a shape different from the generally round, constant radius shape shown in the attached figures. For example, the pivot recess surface 52 can include a variable radius shape or can include at least one planar portions.

Figure 6:
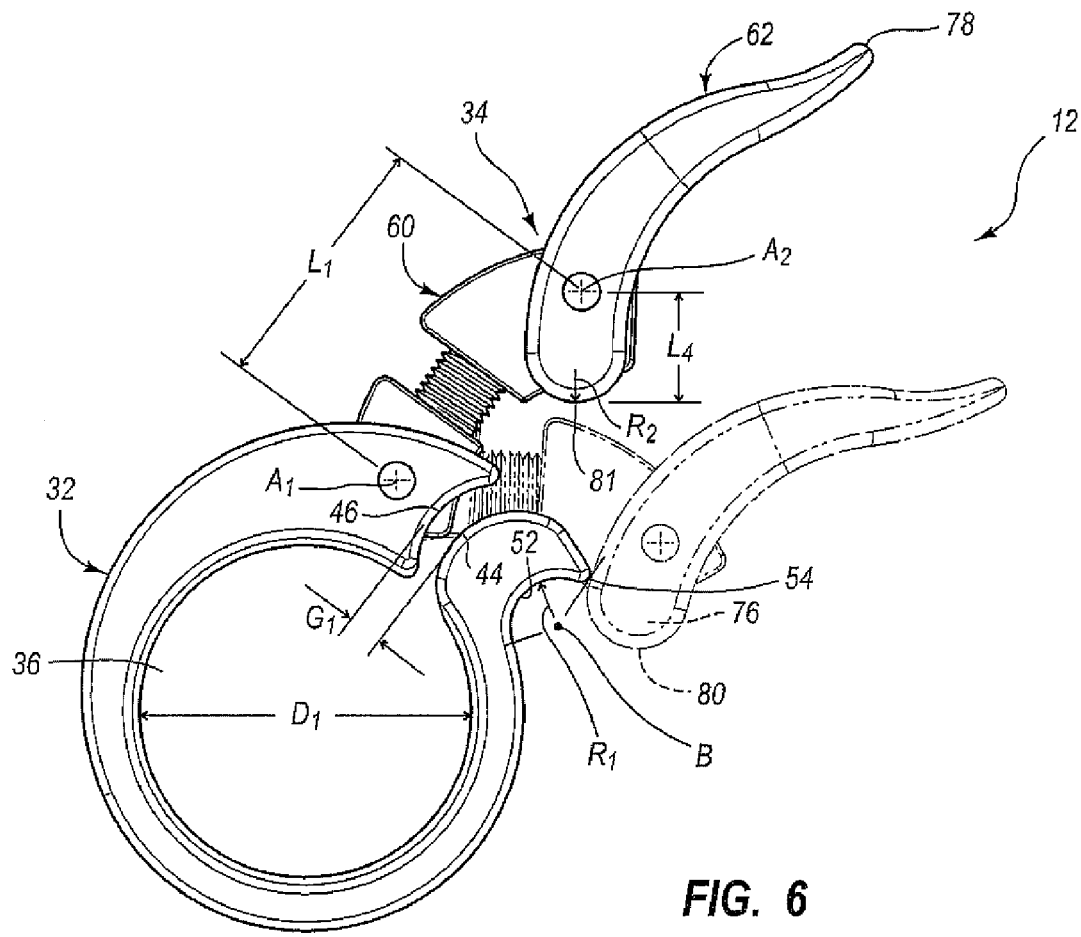
FIG. 6 is a top view of the clamp assembly shown in FIG. 4, wherein the clamp member has a first length.
Figure 8:
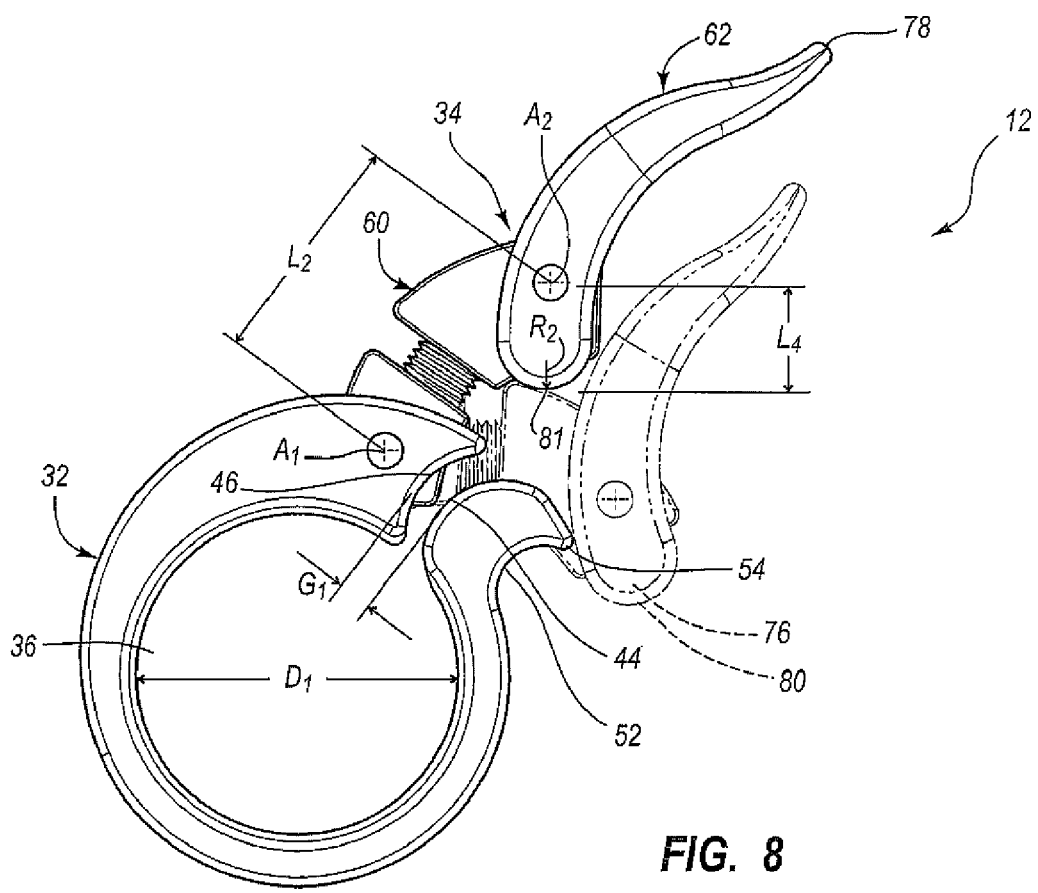
FIG. 8 is top view of the clamp assembly shown in FIG. 4, wherein the clamp member has a second length.

The adjustable size aperture 36 defines an adjustable size inner dimension D. The dimension D may be a diameter when the adjustable size aperture has a generally circular cross-section. Alternatively, the dimension D may be a maximum or minimum width dimension when the adjustable size aperture 36 has a non-circular cross-section. In a relaxed or rest position, the adjustable size aperture 36 shown in FIG. 6 has a dimension $D_1$ as shown in FIGS. 6 and 8. Operation of an adjustable clamping lever of the clamp assembly 12 to a closed position restricts a size of the adjustable size aperture to a dimension $D_2$ or $D_N$ depending on an adjusted length of the adjustable clamping lever 34.

The adjustable size aperture 36 is shown having a generally cylindrical shape having a generally circular cross-section. In other embodiments, the aperture 36 can have other cross-sectional shapes such as, for example, a polygonal cross-sectional shape, an oval shape, or a generally circular shape having a plurality of grooves formed in the outer surface of the pole member. The cross-sectional shape of the aperture 36 can substantially match a shape of an outer surface of the object (e.g., one of the pole members 20, 22, 24) positioned in the aperture 36 to which the clamp assembly 10 is mounted.

Figure 7:
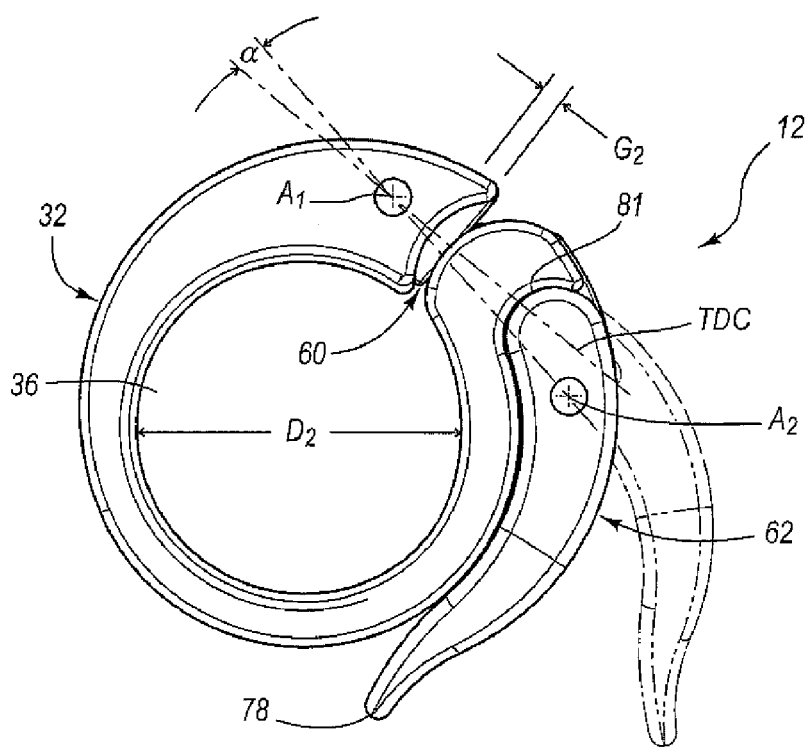
FIG. 7 is a top view of the clamp assembly shown in FIG. 6.
Figure 9:
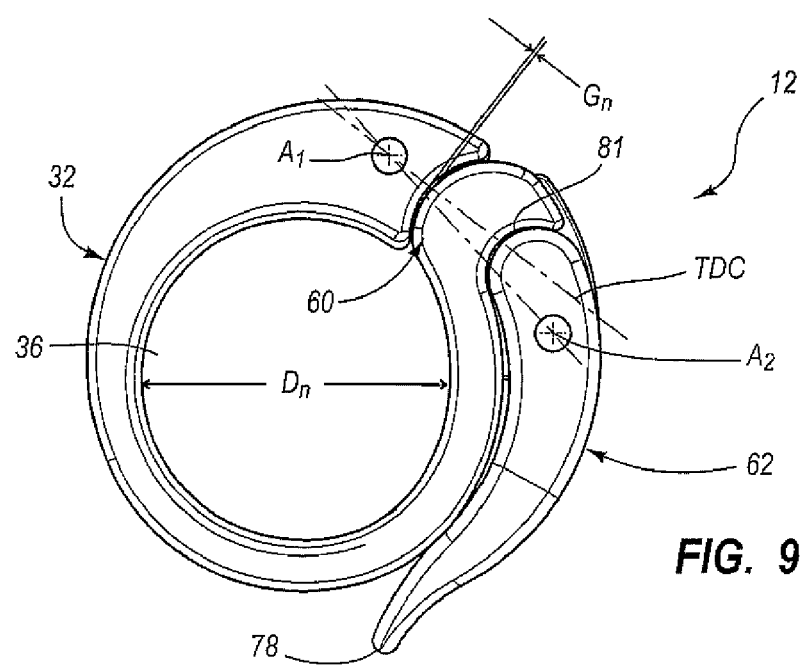
FIG. 9 is a top view of the clamp assembly shown in FIG. 8.

The compression slot 42 defines a gap between the first and second longitudal edges 44, 46. The gap defined by the compression slot 42 has a size $G_1$ when the clamp assembly 12 is in a rest position (see FIGS. 6 and 8). The gap defined by the compression slot 42 is reduced upon activation of the adjustable clamping lever 34 to a gap $G_2$ or $G_N$ as shown in FIGS. 7 and 9. The change in size of the gap defined by the compression slot may be proportional to the change in size between the dimensions $D_1$, $D_2$, $D_N$.

The first and second side edges 44, 46 may include complementary curved surfaces. In one example, the first and second side edges 44, 46 have curved surfaces with the same radius of curvature. When the first and second edges 44, 46 are brought into contact with each other, the shape of the first and second edges 44, 46 may provide an interlocking arrangement that reduces movement in the radial direction of the first and second edges 44, 46 relative to each other. The curvature of the first and second edges 44, 46 is shown facing in the same or similar direction as the curvature of the pivot recess surface 52. In one embodiment, the radius $R_1$ of the pivot recess surface 52 may be constant from the pivot recess lip 54 through an angle β. The angle β may be in the range of, for example, about 80 to 120 degrees (see FIG. 6).

The adjustable length level arrangement 34 includes a first link assembly 60 and a second link member 62. The first link assembly 60 is pivotally attached to the base portion 32 with a first connection axle 84 having a rotation axis A1 (see FIG. 5). The second link member 62 is secured to the first link assembly 60 with a second connection axle 86 having a rotation axis A2. The rotation axis' A1, A2 are arranged parallel to a central axis A3 of the adjustable size aperture 36.

The first link assembly 60 includes first and second link segments 64, 66 that are adjustably connected to each other. The first link segment 64 includes a threaded protrusion 68 that engages a threaded aperture 72 of the second link segment 66. Once the threaded protrusion 68 is threadably engaged with the threaded aperture 72, relative rotation between the first and second link segments 64, 66 alters an operative length $L_1$ of the first link assembly 60 between the body connection axis A1 and the link connection axis A2.

The first link segment 64 also includes a body connection point 71 at a first end 70 of the first link assembly 60, and a link connection point 75 at a second end 74 of the first link assembly 60. The body connection point 71 may be defined as a aperture through the first link segment 64 that is engaged with the first connection axial 84. The link connection point 75 may also be defined as a aperture and is arranged for engagement with the second connection axial 86.

The first and second link segments 64, 66 are at least partially positioned within the first and second link slots 48, 50 of the base portion 32 when the clamp assembly 12 is assembled at least in the closed position shown in FIGS. 7 and 9. The first and second link slots 48, 50 are provided generally at a mid-point along a length $L_3$ of the body 32 (see FIG. 4) such that the first link assembly 60 is also operable at a mid-point along the length $L_3$.

Each of the first and second link segments 64, 66 includes an outer surface 65 having a radius of curvature that substantially matches the curvature of an outer surface 53 of the base portion 32. The first and second link segments 64, 66 also include an inner surface 67 having a radius of curvature that substantially matches the curvature of an inner surface 55 of the adjustable size aperture 36. Typically, the inner surface 67 of the first and second link segments 64, 66 is arranged and configured to remain out of engagement with the pole member to which the clamp assembly is mounted to when the clamp assembly is in either a latched or unlatched position. Providing the inner surface 67 with a contoured shape having a radius of curvature that substantially matches the raise of curvature of inner surface 55 of adjustable size aperture 36 may help minimize chances of the first link assembly 60 interfering with the clamp assembly 12 applying a desired constricting or compressive force on the pole member.

The second link member 62 includes a pivot end 76 that defines a pivot surface 80. The pivot surface 80 includes a constant radius $R_2$. The pivot surface 80 may also define an arc mid-point 81. The arc mid-point 81 may be aligned along a top dead center (TDC) pivot axis for the adjustable length lever assembly 34 as will be described in further detail below.

The second link member 62 also includes a slot 82 sized to receive the second link segment 66. A pivot connection point 83 is defined in the second link member 62 and is arranged in alignment with the link connection point 75 of the second link segment 66 for engagement with the second connection axial 86. The second link 62 rotates about the axis $A_2$ of the second connection axle 86 relative to the first link assembly 60.

The second link member 62 also includes an actuator end 78 disposed opposite the pivot end 76. The actuator end 78 may include structure such as a thumb tab, protrusion, or recess for easier grasping of the actuator end 78 by the user to rotate the second link member 62 relative to the first link assembly 60. The actuator end 78 may be configured for easy grasping and operation by the user when the adjustable clamping lever 34 is in an unlatched position as shown in FIG. 6 or in a latched position as shown in FIG. 7.

A distance from the axis $A_2$ that passes through the pivot connection point 83 to the arc mid-point 81 of pivot surface 80 defines a pivot length $L_4$. The pivot length L4 remains constant while the length between the axis' $A_1$, $A_2$ passing through the connection point 71, 75 of the first link assembly 60 may be varied (i.e., see different lengths $L_1$, $L_2$ in FIGS. 6 and 8).

In operation, the adjustable clamping lever 34 is operable between an unlatched position shown in FIGS. 6 and 8 and a latched position shown in FIGS. 7 and 9. The first link assembly 60 is adjustable in length to provide different inner dimensions $D_2$, $D_N$ of the adjustable size aperture 36 when the adjustable clamping lever 34 is in the latched position.

Referring now to FIG. 6, the adjustable length level arrangement 34 is shown in an unlatched position with the second link member 62 disengaged from the pivot recess surface 52 of the base portion 32. The first and second links segment 64, 66 are rotated relative to each other to provide a first adjusted length $L_1$ between the pivot axis' $A_1$, $A_2$. The second link member has a pivot length $L_4$ measured between the pivot axis A2 and the arc mid-point 81 of the pivot surface 80.

The adjustable length level arrangement 34 is pivoted about the axis $A_1$ until the pivot end 76 of the second link member 62 moves beyond the pivot recess lip 54 and the pivot surface 80 of the second link member 62 engages the pivot recess surface 52 of the base portion 32. The second link member 62 typically pivots about the second axis 82 while the pivot surface moves into engagement with the pivot recess surface 52.

Continued pivoting about the axis' $A_1$, $A_2$ occurs while the second link member 62 is further rotated toward the latched position shown in FIG. 7 until the second link member 62 arrives at a top dead center pivot point along a top dead center (TDC) axis (see the phantom line illustration of second link member 62 in FIG. 7). The TDC axis is defined as a line that passes through the axis $A_1$, the arc mid-point 81 of the pivot surface 80, and the axis 82. Continued rotation of the second link member 62 in the clockwise direction moves the second link member 62 past the top dead center pivot point along the TDC axis until the second link member 62 engages the outer surface 53 of the base portion 32 as shown in FIG. 7.

The orientation of the adjustable clamping lever 34 as shown in solid lines in FIG. 7 represents the latched position. In the latched position, the adjustable size aperture 36 has an inner dimension $D_2$, which is less than the dimension $D_1$ from the unlatched position of the adjustable link lever arrangement 34 shown in FIG. 6. The gap size $G_2$ of the compression slot 42 of the base portion 32 when in the latched position has a size that is less than a gap $G_1$ of the compression slot 42 when the adjustable clamping lever 34 is in the unlatched position shown in FIG. 6.

When the second link member 62 is at the top dead center pivot point along with the TDC axis, the gap defined by the compression slot 42 and the dimension of adjustable size aperture 36 may be smaller than the dimensions $G_2$, $D_2$, respectively, when the adjustable clamping lever 34 is in the latched position shown in FIG. 7. Rotating the second link members 62 clockwise through the top center pivot point may provide a latching motion of the second link member 62 towards the latched orientation shown in FIG. 7. Rotating the second link members 62 clockwise through the top center pivot point may also provide a latching sound that may be perceived by the user. Further, moving the second link 62 past the top dead center pivot point in the clockwise direction may provide a "positive lock" condition for the adjustable lever arrangement 34. A positive lot condition is defined as an arrangement in which the axis $A_2$ and the second link member 62 has rotated past the TDC axis toward the closed or latched position and maintains that arrangement until a sufficiently large force is applied to the second link member 62 to rotate the axis $A_2$ past the TDC axis toward the open or unlatched position.

The second link member 62 typically maintains the closed position shown in FIG. 7 only if the axis $A_2$ has rotated past the TDC axis a certain amount (e.g., and angle α shown in FIG. 7). If the rotated amount (i.e., angle α) is not great enough, the second link member 62 may not be able to maintain the closed position shown in FIG. 7 without application of an additional force in the direction toward the closed position. If the rotated amount is too great, the amount of compressive force applied via the base 32 to the object positioned in the aperture 36 may decrease significantly.

Typically, the amount of force required to move the second link member 62 in the counter clockwise direction past the top dead center pivot point changes depending on, for example, the length $L_1$, the length $L_4$, and the size and shape of other features of the clamp assembly 12.

Further operation of the clamp assembly 12 is now described with additional reference to FIGS. 8 and 9. The clamp assembly 12 may be adjusted to provide a smaller or larger size for the adjustable size aperture 36 by adjusting a length of the first link assembly 60. In one example, the dimension $D_2$ shown in FIG. 7 is not sufficiently small enough to provide the amount of constricting force to the pole assembly 14 to limit relative longitudal movement of the first and second pole members 20, 22. The adjustable clamping lever 34 is moved from the latch stage showing in FIG. 7 to the unlatched position shown in FIG. 6 by applying a force to the actuator end 78 of the second link member 62 in the counter clockwise direction thereby pivoting the first and second link assemblies 60, 62 about the axis' A1, A2 until the pivot end 76 of the second link member 62 is out of engagement with the pivot recess 52 of the base portion 32. The user then rotates the second link segment 66 relative to the first link segment 64 to adjust the operative length L of the first length assembly 60 from length $L_1$ shown in FIG. 6 to length $L_2$ shown in FIG. 8. The length L4 of the second link 62 remains constant.

The user then rotates the adjustable clamping lever 34 about the axis' A1, A2 until the pivot surface 80 of the second link 62 is brought into engagement with the pivot recess 52 of the base portion 32 as described above with reference to FIGS. 6 and 7. The operator applies a force to the actuator end 78 in a clockwise direction to move the second link 62 past the top dead center pivot point along the TDC axis until the second link member 62 moves into the latched position shown in FIG. 9. In the latched position shown in FIG. 9, the adjustable size aperture 36 has a dimension $D_N$ and the gap defined by the compression slot 42 has a size $G_N$. When the length $L_2$ is less than the length $L_1$, the gap $G_N$ is less than the gap $G_2$ and the dimension $D_N$ is less than the dimension $D_2$. The smaller sized dimension $D_N$ may result in application of a greater compressive force to the compressible portion 29 of the pole member to limit relative longitudinal movement of a pair of pole members.

In other arrangements, the length $L_2$ is greater than the length $L_1$. In such an arrangement, the resultant dimension $D_N$ is greater than the dimension $D_2$ and the gap $G_N$ is greater than the gap $G_2$.

The length $L_2$ may require a minimum length that permits operability of the adjustable clamping lever 34 into the latched position. When the length $L_2$ is reduced beyond a minimum length (e.g., when the gap $G_N$ is reduced to zero due to contact between the first and second edges 44, 46), it may not be possible to rotate the second link member 62 in the clockwise direction past the top dead center pivot point along the TDC axis.

The clamp assembly shown in FIGS. 1-9 may be adjusted to account for pole members of different cross-section without the use of additional tools such as wrenches, sockets or screwdrivers, or the use of additional fasteners separate from the link members that make up the adjustable clamping lever 34. In some embodiments, the adjustable clamping lever 34 may comprise fasteners as separate pieces (e.g., screws, bolts, rivets) that provide connection of portions of the adjustable clamping lever 34 to each other and connection of the adjustable clamping lever 34 to the base portion 32.

The example clamp assemblies described herein can be used with a variety of devices. In one example, the clamp assembly can be used with a camera tri-pod, bi-pod, or monopod structure. In another example, the clamp assembly can be used with a telescoping pole for painting, window washing, or tree limb cutting applications. In other examples, the clamp assembly can be used in various sporting applications such as a telescoping pole for collecting golf balls from a pond, height adjustment of a rifle stand, and length adjustment of a fishing pole. Many other applications are possible.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A trekking pole clamp apparatus, comprising:
    a single-piece base portion defining an adjustable size aperture;
    an adjustable clamping lever mounted to the base portion, the adjustable clamping lever including first and second link portions, the first link portion having a first end connected to the base member and pivotable relative to the base member about a first pivot axis, and a second end connected to the second link portion and pivotable relative to the second link portion about a second pivot axis, the second link portion having a pivot end that contacts the base member at a pivot surface and an actuator end that is engageable by a user to move the adjustable clamping lever between a latched position and an unlatched position;
    wherein the first link portion having a length that is adjustable for adjustably clamping the base portion to a trekking pole, the adjustable clamping lever being rotatable from the unlatched position, through a top dead center pivot point, and into the latched position to fix an adjusted position of the trekking pole.

2. The apparatus of claim 1, wherein a length of the second link portion measured between the pivot end and the second pivot axis is constant.

3. The apparatus of claim 1, wherein the adjustable size aperture has a generally circular cross-section.

4. The apparatus of claim 1, wherein the first link member includes first and second link segments, the first link segment having a threaded protrusion sized to rotatably engage within a threaded aperture of the second link segment.

5. The apparatus of claim 1, wherein the pivot end includes a first constant radius surface and the pivot surface includes a second constant radius surface.

6. A trekking pole assembly, comprising:
    a pole assembly, comprising:
        a first pole member;
        a second pole member being insertable within the first pole member;
    a first clamp apparatus mounted to the first pole member, the first clamp apparatus comprising:
        a single-piece base portion defining an adjustable size aperture;
        an adjustable clamping lever pivotally mounted to the base portion at a first end of the adjustable clamping lever, an opposing end of the adjustable clamping lever being movable between a first position detached from the base portion, a second position engaged with the base portion and in an unlatched state, and a third position engaged with the base portion and in a latched state, the adjustable clamping lever having a length that is adjustable, the first clamp apparatus being operable to fix a relative position of the first and second pole members, the adjustable clamping lever being rotatable from the second position, through a top dead center pivot point, and into the third position.

7. The trekking pole assembly of claim 6, wherein when the adjustable clamping lever is in the first and second positions, the first clamp apparatus permits relative movement between the first and second pole members, and when the adjustable clamping lever is in the third position the first clamp apparatus applies a constricting force to the first pole member that restricts relative movement between the first and second pole members.

8. The trekking pole assembly of claim 6, wherein the pole assembly further includes a third pole member and second clamp apparatus, the third pole member being insertable within the second pole member, the second clamp apparatus including:
    a single-piece base portion defining an adjustable size aperture;
    an adjustable clamping lever pivotally mounted to the base portion at a first end of the adjustable clamping lever, an opposing end of the adjustable clamping lever being movable between a first position detached from the base portion, a second position engaged with the base portion and in an unlatched state, and a third position engaged with the base portion and in a latched state, the adjustable clamping lever having a length that is adjustable, the first clamp apparatus being operable to fix a relative position of the second and third pole members, the adjustable clamping lever being rotatable from the second position, through a top dead center pivot point, and into the third position.

9. The trekking pole assembly of claim 6, wherein the adjustable clamping lever includes first and second link portions, the first link portion having a first end pivotally connected to the base member and a second end pivotally connected to the second link portion, the second link portion having a pivot end that contacts the base member at a pivot surface and an actuator end that is engageable by a user to move the adjustable clamping lever between the second and third positions.

10. The trekking pole assembly of claim 9, wherein a length of the first link portion is variable.

11. The trekking pole assembly of claim 10, wherein a length of the second link portion measured between the pivot end and a point at which the second link portion is connected to the first link portion is constant.

12. A trekking pole clamp apparatus, comprising:
    a single-piece base portion defining an adjustable size aperture and having a pivot recess and a pivot recess lip defined at an edge of the pivot recess;

an adjustable clamp lever comprising:
- a first link portion pivotally mounted to the base portion at a first pivot point, the first link portion having a length that is adjustable;
- a second link portion pivotally connected to the first link portion at a second pivot point, the second link portion having a pivot end and an actuator end, the adjustable clamp lever being movable between a disconnected position with the pivot end removed from contact with the pivot recess and the pivot recess lip, a connected position with the pivot end engaged with the pivot recess and retained in the connected position with the recess lip and the actuator end is spaced away from the base portion, and a locked position wherein the actuator end is in engagement with the pivot recess and rotated from the connected position, through a top dead center pivot point, and into a position adjacent to the base portion.

13. The apparatus of claim 12, wherein the pivot recess defines an arc having a midpoint, and a top dead center line passes through the first pivot point and the midpoint, wherein moving the second link portion from the connected position through the top dead center line to the locked position provides retention of the second link portion in the locked position.

* * * * *